Patented Apr. 10, 1945

2,373,627

UNITED STATES PATENT OFFICE 2,373,627

ORGANIC PHOSPHORUS COMPOUNDS

Melvin A. Dietrich, Claymont, Del., assignor to E. I. du Pont de Nemours & Company, Wilmington, Del., a corporation of Delaware No Drawing. Application September 20, 1940, Serial No. 357,607

4 Claims. (Cl. 260—461)

This invention relates to the production of new organic derivatives of phosphorus and, more particularly, to the production of new liquid derivatives of trivalent phosphorus.

Previously, organic derivatives of phosphorus have been proposed which have value in improving the stability of organic substances which are subject to oxidative deterioration. Such organic derivatives of phosphorus have also been proposed for use in improving the load-bearing capacity of lubricating oils.

The majority of these phosphorus derivatives exhibit either one or the other of these properties to varying degrees but, generally speaking, they do not combine both of these characteristics to as high a degree as is necessary and desirable. Phosphorus derivatives which combine both high stabilizing action and high load-bearing capacity would, therefore, possess considerable practical value.

The production of stable, high-boiling, non-discoloring liquids is of interest in the manufacture of plasticizers and stabilizers for various films and plastics and for the lubrication of textile fibres and textile machinery. In order to secure anywhere near satisfactory stabilizing action from any of the known phosphorus derivatives it has usually been found necessary to utilize these derivatives in considerably higher concentrations than is economically desirable.

It is an object of the present invention to overcome the disadvantages and shortcomings of the prior art and to provide stable, high-boiling, non-discoloring liquid derivatives of trivalent phosphorus.

It is a further object of this invention to provide liquid derivatives of trivalent phosphorus which possess high stabilizing action when used in relatively low concentrations in highly refined mineral oils.

Other objects and advantages of this invention will be apparent by reference to the following specification.

These objects are accomplished by the preparation of phosphites of esters and amides of hydroxyacetic acid. The term "amide" as used herein includes both unsubstituted amides and amides derived from hydroxyacetic acid and amines containing at least one replaceable hydrogen atom on the nitrogen atom. The compounds of this invention may be represented by the general structure:

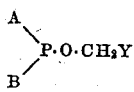

where Y is an ester or amide group connected to the CH$_2$ through the carbonyl carbon of the ester or amide group, and A and B are hydroxyl, alkoxy, or aryloxy groups, or hydroxyacetic residues similar to —O·CH$_2$Y.

Various methods may be used for preparing the compounds of this invention such as set forth in the examples which follow. In addition to those methods described in the following examples, suitable ways for preparing the compounds include the reaction of the sodium or other alkali metal salts of the hydroxyacetate utilized (that is

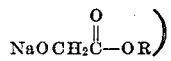

with phosphorus trichloride or tribromide and reaction of the hydroxyacetates with phosphorus trioxide.

The preparation and properties of the phosphites of various esters of hydroxyacetic acid are described in the following examples wherein parts are by weight unless otherwise stated.

EXAMPLE 1

To a mixture of 52.8 parts of isobutyl hydroxyacetate, 32 parts of pyridine and 160 parts of benzene, there was added with vigorous agitation and cooling a solution of 18.3 parts of phosphorus trichloride in 40 parts of benzene. The reaction mixture was allowed to stand 15 hours, then warmed on a steam bath for 20 minutes and filtered. The solution was then shaken with a small amount of sodium carbonate monohydrate, filtered, and the benzene removed by distillation under vacuum. The colorless liquid residue was distilled under reduced pressure and yielded 32 parts of material having a boiling range of 185°–215° C./2 mm. and a phosphorus content of 7.54%. The calculated phosphorus content for

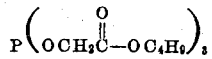

is 7.35% and the compound prepared consists, therefore, primarily of the tri-derivative.

EXAMPLE 2

The procedure used was the same as that described in the preceding example. A mixture of 23 parts of n-octyl hydroxyacetate, 10 parts of pyridine, and 80 parts of benzene were treated with 5.5 parts of phosphorus trichloride dissolved in 40 parts of benzene. On working up the reaction mixture 25.5 parts of a colorless liquid product was obtained having a phosphorus content of 4.81% compared to a calculated value of 5.23% for

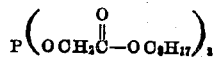

EXAMPLE 3

Using the same procedure as in Example 1, 26.4 parts of ethyl hydroxyacetate, 24 parts of pyridine, and 80 parts of benzene were treated with 13.8 parts of phosphorous trichloride in 60 parts of benzene. On purification 17 parts of a colorless liquid was obtained having a boiling range of 115°–200° C./5 mm. and a phosphorus content of 8.98%, compared to a calculated value of 9.12% for the compound

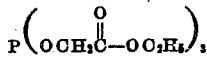

EXAMPLE 4

Using a procedure similar to that given in Example 1, a mixture of 37.6 parts of 2-ethylhexyl hydroxyacetate, 15.8 parts of pyridine and 80 parts of benzene on treatment with 9.25 parts of phosphorus trichloride in 40 parts of benzene yielded 30 parts of a colorless liquid having a phosphorus content of 5.99%. Since the theoretical value for the tri-derivative,

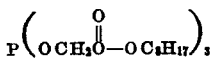

is 5.23%, the product obtained is a mixture containing a substantial amount of di-derivative with the tri-compound.

EXAMPLE 5

From 31.6 parts of cyclohexyl hydroxyacetate, 15.8 parts of pyridine dissolved in 160 parts of benzene followed by reaction with 9.1 parts of phosphorus trichloride in 40 parts of benzene there was obtained 27 parts of a colorless liquid having a phosphorus content of 7.09%. The calculated value for the tri-derivative being 6.23%, the product obtained is a mixture of the various possible phosphite derivatives.

EXAMPLE 6

A mixture of 18.7 parts of N-dibutyl hydroxyacetamide, 8 parts of pyridine and 160 parts of benzene was treated with 4.6 parts of phosphorus trichloride in 40 parts of benzene. After filtration, the solution was washed with water, dried over anhydrous sodium sulfate, and the solvent removed in vacuo. There was obtained 18 parts of a yellow liquid with a phosphorus content of 5.20% compared to a calculated value of 5.26% for

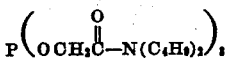

EXAMPLE 7

An ester was prepared from hydroxyacetic acid and alcohols having a boiling range of 150° to 160° C. and obtained by hydrogenation of carbon oxides under elevated temperatures and pressures as described in U. S. Patents 1,844,129, 1,844,857 and 1,939,708. A mixture of 34.8 parts of this ester with 15.8 parts of pyridine in 160 parts of benzene was treated as in Example 1 with a solution of 9.1 parts of phosphorus trichloride in 40 parts benzene. On working up the reaction mixture, a colorless liquid was obtained having a phosphorus content of 5.54%. The theoretical phosphorus content for a tri-derivative, based on the average carbon content of the alcohols used in preparation of the ester, was estimated to be 5.63%.

The foregoing examples illustrate the application of this invention to the preparation of phosphites of esters and amides of hydroxyacetic acid, including esters of hydroxyacetic acid derived from alcohols containing from 2 to 8 carbon atoms. Other esters and amides from which phosphites may be prepared are:

Tetrahydrofurfuryl hydroxyacetate
Propyl hydroxyacetate
Isopropyl hydroxyacetate
n-Butyl hydroxyacetate
Amyl hydroxyacetate
Isoamyl hydroxyacetate
Sec-amyl hydroxyacetate
N-dimethylhydroxyacetamide
N-diethylhydroxyacetamide
N-propylhydroxyacetamide
N-isobutylhydroxyacetamide
N-butylhydroxyacetamide
N-diamylhydroxyacetamide
N-isoamylhydroxyacetamide
N-cyclohexylhydroxyacetamide
N-dicyclohexylhydroxyacetamide
Hexyl hydroxyacetate
Heptyl hydroxyacetate
Nonyl hydroxyacetate
Decyl hydroxyacetate
Dodecyl hydroxyacetate
Phenyl hydroxyacetate
Benzyl hydroxyacetate
p-Phenoxyphenyl hydroxyacetate
p-Phenoxycyclohexyl hydroxyacetate
Dicyclohexylaminoethyl hydroxyacetate
Diethylaminoethyl hydroxyacetate
Oleyl hydroxyacetate
Cetyl hydroxyacetate
Octadecyl hydroxyacetate
Ethoxyethyl hydroxyacetate
Butyloxyethyl hydroxyacetate
Methoxyethyl hydroxyacetate
Ethylthioethyl hydroxyacetate
Phenylthioethyl hydroxyacetate
Dodecylthiopropyl hydroxyacetate
N-ethyl-N-cyclohexyl-hydroxyacetamide
N-decylhydroxyacetamide
N-dodecylhydroxyacetamide
N-phenylhydroxyacetamide
N-diphenylhydroxyacetamide
N-methyl-N-phenyl hydroxyacetamide
N-ethyl-N-phenyl hydroxyacetamide
N-(beta-diethylaminoethyl) hydroxyacetamide
N-tetrahydrofurfurylhydroxyacetamide
N-morpholinohydroxyacetamide
N-benzylhydroxyacetamide
N-dibenzylhydroxyacetamide
N-cyclopentylhydroxyacetamide
N-cycloheptylhydroxyacetamide
N-(omega-cyanopentyl)hydroxyacetamide
N-(beta-naphthyl)hydroxyacetamide
N-(p-phenoxyphenyl)hydroxyacetamide In the examples phosphorus trichloride is used as the reagent for converting the hydroxyacetates into phosphites with pyridine as the acid acceptor. In place of pyridine, other suitable acid acceptors which may be used include dimethylaniline, sodium carbonate, and calcium carbonate. If the reaction is performed under reduced pressure, an acid acceptor may not be needed since the acid given off during the reaction will be drawn off in the gaseous state.

The compounds may be prepared by reaction in any inert solvent such as ligroin, kerosene, chloroform, carbon tetrachloride, dichlorodiethyl ether, dioxan, and toluene. The reaction is preferably performed at temperatures of 15° to 40° C. but may be successfully conducted at temperatures of from 0° C. to 80° C. without serious deterioration in the product.

The reaction products may be neutral phosphites, wherein all of the three phosphorus valences are taken up by organic radicals or they may be acid phosphites wherein only one or two of the valences are satisfied by organic radicals, the remainder being taken up with OH radicals. The products may be mixtures of the above types.

The products may also consist of mixtures derived from the reaction of a phosphorus halide with mixed hydroxyacetates or hydroxyacetamides. For example, phosphites may be prepared from a mixture of isobutyl hydroxyacetate and N-dibutylhydroxyacetamide, ethyl hydroxyacetate, and N-phenylhydroxyacetamide, isopropyl hydroxyacetate and N-dicyclohexylhydroxyacetamide, ethyl and isoamyl hydroxyacetates, as well as cyclohexyl and tetrahydrofurfuryl hydroxyacetates.

The products of this invention have been found especially useful in reducing the tendency of highly refined mineral oils to break down or decompose with the formation of products corrosive to alloy bearings containing copper and cadmium. The products of this invention also markedly improve the load-bearing capacity of lubricants in general.

The effectiveness of the compounds of this invention in stabilizing lubricating oils is shown in the following table, the method of evaluation being the same as that described in U. S. Patent 2,198,961, page 2, second column, lines 28 to 54. A solvent extracted oil of mid-continent origin and SAE 30 grade was used in the test with strips from cadmium-silver alloy bearings.

TABLE I

*Lubricant stabilization tests*

| Inhibitor | Concentration, per cent by wt. | Corrosion time,[1] hours | Saybolt viscosity at [2] 210° F., secs. |
|---|---|---|---|
| None—control | | 8 | 99.0 |
| Phosphite of isobutyl hydroxyacetate | 0.05 | 213 | 75 |
| Phosphite of— n-Octyl Hydroxyacetate | 0.05 | 233 | 74 |

[1] Hours to 10 mg./sq. in. corrosion of cadmium-silver.
[2] After 100 hours of test.

These products also showed high efficiency at 0.25% concentration but their excellent stabilizing effect at the low concentration of 0.05% is particularly noteworthy.

The effect of these products on load-bearing capacity of a mineral oil was determined on the Cornell friction tester. This tester consists essentially of a steel pin, held in place by a brass shear pin, which rotates between the flat surfaces of two cylindrical steel blocks. These blocks serve as part of a jaw mechanism which is drawn together at a uniform rate by means of a ratchet and screw during operation, thus applying a continuously increasing load between the steel pin and blocks. The point at which the lubricating film breaks down sufficiently to permit seizure is indicated either by the development of a "squeal" or by the shearing of the brass pin. In the following example, the jaw load at point of seizure is given in pounds for the compound under test.

TABLE II

*Cornell film strength tests*

[Using a naphthenic base SAE 30 oil]

| Compound | Concentration, per cent by weight | Load at seizure, pounds |
|---|---|---|
| None—control | | 1,100 |
| Phosphite of isobutyl hydroxyacetate | 1.0 | 3,000 |

In cases where oils formed considerable sludge under oxidizing conditions these phosphites served as sludge inhibitors. This was demonstrated by heating 20 grams of a paraffin base SAE 20 oil in a 125 cc. Erlenmeyer flask for 65 hours at 170° C. A small piece of autobody steel (¾ in. x ⅝") was immersed in the oil during the test. Sludge results, determined by dilution of the oil with special naphtha and weighing the precipitated material, are given in the following table.

| Compound | Concentration, per cent by weight | Sludge, mg./10 gm. oil |
|---|---|---|
| None—control | | 263 |
| Phosphite of ethyl hydroxyacetate | 0.5 | 110 |
| Phosphite of isobutyl hydroxyacetate | 0.5 | 138 |

Now having described the preferred embodiments of my invention, it is to be understood that I do not limit myself to the specific embodiments thereof, except as defined in the following appended claims.

I claim:

1. A phosphite of a compound selected from the group consisting of esters and amides of hydroxyacetic acid.

2. A phosphite of an ester of hydroxyacetic acid and an alcohol containing from 2 to 8 carbon atoms.

3. A phosphite of an ester of hydroxyacetic acid and alcohols obtained by catalytic pressure hydrogenation of oxides of carbon.

4. A phosphite of isobutyl hydroxyacetate.

MELVIN A. DIETRICH.